United States Patent
Pan

(10) Patent No.: US 11,888,827 B2
(45) Date of Patent: Jan. 30, 2024

(54) SECURE DATA TRANSFER APPARATUS, SYSTEM, AND METHOD

(71) Applicant: Huawei Technologies Co., Ltd., Shenzhen (CN)

(72) Inventor: Shilin Pan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 478 days.

(21) Appl. No.: 17/158,591

(22) Filed: Jan. 26, 2021

(65) Prior Publication Data

US 2021/0152531 A1     May 20, 2021

Related U.S. Application Data

(63) Continuation of application No. PCT/CN2018/100649, filed on Aug. 15, 2018.

(51) Int. Cl.
*H04L 9/32* (2006.01)
*H04L 9/08* (2006.01)
(Continued)

(52) U.S. Cl.
CPC ........ *H04L 63/0428* (2013.01); *H04L 9/0825* (2013.01); *H04L 9/3213* (2013.01);
(Continued)

(58) Field of Classification Search
CPC ......... G06F 12/1408; G06F 2212/1052; H04L 63/0428
See application file for complete search history.

(56) References Cited

U.S. PATENT DOCUMENTS

| | | | |
|---|---|---|---|
| 8,543,838 B1* | 9/2013 | Au | G06F 21/78 |
| | | | 713/190 |
| 2011/0138192 A1* | 6/2011 | Kocher | H04L 9/088 |
| | | | 713/189 |

(Continued)

FOREIGN PATENT DOCUMENTS

| | | |
|---|---|---|
| CN | 101788958 A | 7/2010 |
| CN | 102582536 A | 7/2012 |

(Continued)

OTHER PUBLICATIONS

Gu Shuang-Shuang et al., A Program of Authentication and Key Protection for Hard Disk Encryption, Journal of Cryptologic Research, 2016, 3(2), 11 pages.

*Primary Examiner* — Mohammad A Siddiqi
(74) *Attorney, Agent, or Firm* — Conley Rose, P.C.

(57) ABSTRACT

A secure data transfer apparatus, where a processor in the apparatus is configured to execute a driver software to generate cryptography information, a cryptography device in the apparatus is configured to obtain a current cryptography parameter based on the cryptography information, and perform a cryptography operation using the current cryptography parameter, a Peripheral Component Interconnect Express (PCIe) interface in the apparatus configured to perform a ciphertext data exchange with a memory controller in a memory located external to the apparatus, where the ciphertext data exchange includes sending the ciphertext data from the cryptography device to the memory controller when the memory is to be written, and sending the ciphertext data from the memory controller to the cryptography device when the memory is to be read.

20 Claims, 7 Drawing Sheets

| Address 1 | Key 1 | Vector 1 |
|---|---|---|
| Address 2 | Key 2 | Vector 2 |
| Address 3 | Key 3 | Vector 3 |
| ⋮ | ⋮ | ⋮ |
| Address n | Index n | Vector n |

(51) Int. Cl.
*H04L 29/08* (2006.01)
*H04L 9/40* (2022.01)
*H04L 67/10* (2022.01)
*H04L 67/12* (2022.01)
*H04L 67/63* (2022.01)
*H04W 4/44* (2018.01)

(52) U.S. Cl.
CPC ........ *H04L 9/3247* (2013.01); *H04L 63/0823* (2013.01); *H04L 63/126* (2013.01); *H04L 67/10* (2013.01); *H04L 67/12* (2013.01); *H04L 67/63* (2022.05); *H04W 4/44* (2018.02)

(56) References Cited

U.S. PATENT DOCUMENTS

| | | |
|---|---|---|
| 2012/0155645 A1 | 6/2012 | Porchaska et al. |
| 2013/0054977 A1 | 2/2013 | Basmov et al. |
| 2013/0297948 A1 | 11/2013 | Lee et al. |
| 2015/0046702 A1 | 2/2015 | Paaske et al. |
| 2016/0085692 A1 | 3/2016 | Kwok |
| 2016/0182223 A1 | 6/2016 | Kishinevsky et al. |
| 2016/0226661 A1* | 8/2016 | Keidar .................. H04L 9/3231 |
| 2017/0185532 A1* | 6/2017 | Durham ................ H04L 9/0637 |
| 2018/0011802 A1 | 1/2018 | Ndu et al. |
| 2018/0062828 A1* | 3/2018 | Cioranesco ........... H04L 9/0618 |
| 2018/0137294 A1* | 5/2018 | Van Antwerpen .... G06F 3/0661 |
| 2019/0362105 A1* | 11/2019 | Courtney ............. G06F 13/1668 |
| 2020/0412523 A1* | 12/2020 | Tunstall ................ G06F 21/755 |
| 2021/0028934 A1* | 1/2021 | Hamburg ............... G06F 21/602 |

FOREIGN PATENT DOCUMENTS

| | | |
|---|---|---|
| CN | 102855452 A | 1/2013 |
| CN | 103020549 A | 4/2013 |
| CN | 103258172 A | 8/2013 |
| CN | 103383668 A | 11/2013 |
| CN | 104871169 A | 8/2015 |
| CN | 106341226 A | 1/2017 |
| EP | 2466848 A1 | 6/2012 |
| EP | 2741228 A2 | 6/2014 |
| WO | 2016122979 A1 | 8/2016 |
| WO | 2017014885 A1 | 1/2017 |

* cited by examiner

SECURE DATA TRANSFER APPARATUS, SYSTEM, AND METHOD

CROSS-REFERENCE TO RELATED APPLICATIONS

This application is a continuation of International Patent Application No. PCT/CN2018/100649 filed on Aug. 15, 2018, which is hereby incorporated by reference in its entirety.

TECHNICAL FIELD

This application relates to the field of electronic technologies, and in particular, to a secure data transfer apparatus, system, and method.

BACKGROUND

Files that are related to various types of data and that are on various types of terminal devices, such as a mobile phone, are encrypted through various possible encryption technologies. For example, a common file encryption solution is to use a manner in which each file is corresponding to one key (per file per key). The key may be associated with a user personal identification number (PIN), and is stored in a preset storage area in the mobile phone, for example, in a data memory or a dedicated storage area of a runtime memory. The mobile phone may obtain the key from the dedicated storage area, and encrypt or decrypt the file or data using the key. An unencrypted file or unencrypted data is plaintext data. An encrypted file or encrypted data is ciphertext data, and the ciphertext data may be further stored in the data memory or the runtime memory. For example, the data memory is a non-volatile memory, and the runtime memory is a volatile memory. When needing to read the file, the mobile phone may read the ciphertext data from the data memory or the runtime memory, and decrypt related ciphertext data using the key, to obtain plaintext data. Because encryption and decryption are needed in a data read/write process, reading and writing of the data memory or the runtime memory are more secure.

A common existing encryption/decryption solution is to use software. To be specific, a processor in the mobile phone, for example, a central processing unit (CPU), is used, to run secure cryptography software to implement a cryptography operation on the data or the file, that is, performing encryption/decryption. Various types of intermediate data and control instructions generated when the processor runs the software may be temporarily stored in the runtime memory. After encryption is completed, the processor may store the ciphertext data in the data memory. When the data is read from the data memory, the processor is used, to run the software to decrypt the encrypted data, that is, the ciphertext data. In addition to performing the cryptography operation, the processor further performs another operation, for example, running driver software, an operating system (OS), or application software. In addition to a limited operation capability, a case in which a speed does not meet a requirement may exist such that system performance is affected.

Another common existing cryptography solution is to use a memory controller that can read/write the data memory, to perform the cryptography operation. For example, for a data memory of a Universal Flash Storage (UFS) type, the mobile phone further configures, in a system on chip (SoC) of the mobile phone, a memory controller that controls the UFS memory, to support reading data from and writing data into the UFS memory. The memory controller is controlled by a processor in the system on chip, and further performs, on the UFS memory, a data read/write operation, and the cryptography operation. When the processor needs to perform data transfer, that is, write data into the UFS memory or read data from the UFS memory, the processor does not perform the cryptography operation on to-be-operated data by running the software, but performs the cryptography operation by driving the memory controller. That is, different from the software cryptography solution, the memory controller in the existing solution is a dedicated hardware accelerator located outside the processor. Therefore, the memory controller can implement a secure data transfer operation according to an instruction of the processor, and processing performance is relatively high. However, a memory technology often evolves into an updated version. For example, there are a plurality of versions such as a UFS 1.0, a UFS 2.0, or a UFS 3.0. A UFS memory of an updated version has a higher read/write speed. However, the memory controller in the system on chip in the mobile phone cannot be updated once the mobile phone is delivered from a factory. Therefore, the mobile phone and the memory controller do not support the UFS memory of the new version. To support an updated UFS memory, a protocol specification of a memory supported by the memory controller in the system on chip also needs to be updated, that is, a new system on chip needs to be used in the terminal device. This solution has poor extensibility and high implementation complexity.

To increase the extensibility and reduce the complexity, a memory technology in which a built-in memory controller is used is developed, for example, a non-volatile memory (NVM) Express (NVMe) technology. Different from the UFS memory, in this technology, an NVMe memory is equipped with a built-in memory controller. To be specific, the NVMe memory includes a storage medium, and further includes the memory controller configured to read/write data. In this case, a memory controller configured to read/write the NVMe memory does not need to be disposed in the system on chip. Therefore, in the existing solution, the system on chip may be connected, through a universal interface, for example, a Peripheral Component Interconnect (PCI) Express (PCIe) interface, to the memory controller built in the NVMe memory. The processor in the system on chip sends a data read/write instruction to the memory controller through the PCIe interface and performs the data transfer through the PCIe interface. The built-in memory controller further receives unencrypted data from a system-on-chip side through the PCIe interface, encrypts the data, and writes ciphertext data into the storage medium. The built-in memory controller may further read the ciphertext data from the storage medium, and decrypt the ciphertext data to obtain plaintext data, to transmit the plaintext data to the system-on-chip side through the PCIe interface. Because the system on chip is connected to the NVMe memory through the PCIe interface, the PCIe interface has high extensibility, and can be flexibly applicable to memory types of different memory protocols. For example, no matter how the NVMe memory technology evolves, the NVMe memory is connected to the system on chip through the PCIe interface. There is no need to specially design any dedicated memory controller or interface in the system on chip. When the NVMe memory technology is updated, there is no need to synchronously update the system on chip, and this is easy to implement. Therefore, the technology that the memory is equipped with the built-in memory controller is becoming increasingly popular.

However, the NVMe memory technology that is equipped with the built-in memory controller has the following disadvantage. All data transferred between the system on chip and the NVMe memory through the PCIe interface is the plaintext data. This solution in which the plaintext data is exposed to the general PCIe interface for transmission makes it difficult to ensure data read/write security. Therefore, how to securely transfer the data between the system on chip and the memory based on the system performance being ensured becomes a problem.

SUMMARY

Embodiments of this application provide a secure data transfer apparatus, system, and method, to provide a solution that is easy to implement, has high extensibility, and can securely transfer data, to implement a secure read/write operation on a memory.

According to a first aspect, a secure data transfer apparatus is provided. The apparatus may be a system on chip or an apparatus including a system on chip, for example, a circuit board. The apparatus may be located in any electronic device, for example, a terminal device. The apparatus includes a processor configured to run driver software to generate cryptography information, a cryptography device configured to obtain a current cryptography parameter based on the cryptography information, and perform a cryptography operation using the current cryptography parameter, where the cryptography operation includes at least one of the following: encrypting plaintext data to obtain ciphertext data, or decrypting the ciphertext data to obtain the plaintext data, and a first interface, coupled to the cryptography device, and configured to perform ciphertext data exchange with a first memory controller in a first memory located outside the apparatus, where the ciphertext data exchange includes sending the ciphertext data from the cryptography device to the first memory controller when the first memory needs to be written, or sending the ciphertext data from the first memory controller to the cryptography device when the first memory needs to be read. In the technical solution of the first aspect, the cryptography operation is performed by the dedicated cryptography device other than the processor such that all data exchanged with the external first memory is the ciphertext data. The technical solution is secure and fast. In addition, only the first interface is required to couple to the external first memory controller, and there is no need to integrate the first memory controller inside the apparatus. Therefore, the solution has high extensibility, and is easy to implement.

Optionally, a type of the first interface may be flexibly selected. For example, the first interface includes a peripheral component interconnect express PCIe interface. This type of interface has the high extensibility and a high transmission speed, and can better meet a system requirement. Optionally, the first memory includes an NVMe memory.

Optionally, the plaintext data includes but is not limited to any one of the following program code, an operation result, user data, system data, or the like. Optionally, the cryptography operation uses an Advanced Encryption Standard (AES) algorithm. Optionally, the processor includes a CPU. Optionally, the cryptography device is a hardware accelerator. Optionally, the cryptography device and the first interface are included in one connector, and the processor is coupled to the connector through a bus.

In a possible implementation, the current cryptography parameter includes at least one of a current key or a current cryptography vector. Usually, the key is a most important cryptography parameter, and the cryptography vector is a cryptography parameter used together with the key such that security can be further improved.

In a possible implementation, the cryptography device is further configured to perform plaintext data exchange with a second memory located outside the apparatus, and the plaintext data exchange includes obtaining the plaintext data from the second memory when the first memory needs to be written, or providing the plaintext data for the second memory when the first memory needs to be read. In this solution, the ciphertext data provided for the first memory may be from the second memory. Similarly, the ciphertext data obtained from the first memory may be provided for the second memory. This implements data transfer between two memories and ensures the security. For example, the first memory is a data memory, and the second memory is a runtime memory. For another example, the data memory is a non-volatile memory, and the runtime memory is a volatile memory. Based on this solution, data in the runtime memory is promptly stored in the data memory to avoid a loss, and data that needs to be processed may be loaded from the data memory to the runtime memory at any time.

Further, the apparatus includes a second memory controller coupled to the cryptography device and the second memory, where the second memory controller is configured to perform reading the plaintext data from the second memory when the first memory needs to be written, and sending the plaintext data to the cryptography device, or receiving the plaintext data from the cryptography device when the first memory needs to be read, and writing the plaintext data into the second memory. Because the second memory controller is not located in the second memory, but is located inside the apparatus, the second memory is different from the first memory. This solution can implement secure data transfer between two different types of memories. Optionally, the second memory controller may be coupled to the bus.

In a possible implementation, the cryptography device includes a control circuit configured to obtain a current storage address related to the writing or reading of the first memory, and obtain, based on the cryptography information, the current cryptography parameter corresponding to the current storage address, and a cryptography circuit configured to perform the cryptography operation using the current cryptography parameter. In this solution, data may be divided into a plurality of parts. Any part of data that is to be processed is uniquely corresponding to one cryptography parameter, and the cryptography parameter is uniquely corresponding to a current storage address of the part of data. Therefore, different data corresponding to different storage addresses has different cryptography parameters, and the security is further improved.

Optionally, the cryptography information includes a key index table, and the key index table includes a plurality of storage addresses and a key index corresponding to each storage address. The cryptography device further includes a storage unit configured to store a key lookup table, and the key lookup table includes a plurality of key indexes and a key corresponding to each key index. The processor is further configured to store the key index table in the second memory located outside the apparatus. The control circuit is configured to obtain the current storage address, search the key index table in the second memory to obtain a current key index corresponding to the current storage address, and further search the key lookup table in the storage unit to obtain the current key corresponding to the current key index. In this solution, the processor is only configured to generate the key index table, and the key is not directly obtained by the processor. In addition, because being stored in the storage unit inside the cryptography device, the key is not easily obtained by any component, for example, the processor, that is other than the cryptography device, and the security is ensured. Further, the key index table includes a cryptography vector corresponding to each storage address. The control circuit is further configured to search the key index table to obtain a current cryptography vector corresponding to the current storage address, to further improve the security.

Alternatively, the cryptography information includes a key configuration table, and the key configuration table includes a plurality of storage addresses and a cryptography parameter corresponding to each storage address. The processor is further configured to store the key configuration table in the second memory located outside the apparatus. The control circuit is configured to obtain the current storage address, and search the key configuration table in the second memory to obtain the current cryptography parameter corresponding to the current storage address.

Alternatively, the cryptography information includes a key configuration table, and the key configuration table includes a plurality of storage addresses and a cryptography parameter corresponding to each storage address. The cryptography device further includes a storage unit configured to store the key configuration table. The processor is further configured to configure the key configuration table in the storage unit. The control circuit is configured to obtain the current storage address, and search the key configuration table in the storage unit to obtain the current cryptography parameter corresponding to the current storage address.

Optionally, the key index table or the key configuration table mentioned above may be merged in an input/output command table. For example, the input/output command table includes a scatter/gather list (SGL) or a physical region page (PRP) table. In this way, this solution can be well compatible with an existing memory protocol, save storage resources, and simplify a processing process.

Further, the current storage address is a first address of the ciphertext data in a storage medium in the first memory. Alternatively, the current storage address is a second address of the plaintext data in the second memory located outside the apparatus. In this solution, because either the first address in the storage medium in the first memory or the second address in the second memory may be used as an index used to search for a key, there is no need to specially generate another type of key index, and implementation is simple.

Further, the processor is further configured to update the current storage address in real time. For example, the processor is further configured to update an address in the key index table or the key configuration table based on a change of the first address or the second address in real time. In this solution, even if the first address in which the ciphertext data is stored or the second address in which the plaintext data is stored changes, this change does not affect a pointed cryptography parameter.

Further, the processor is further configured to generate an input/output command, and the input/output command is used to indicate the current storage address. Optionally, the input/output command is provided for the first memory controller. The first interface is configured to obtain the current storage address from the first memory controller, and forward the current storage address to the control circuit. The control circuit is further configured to receive the current storage address forwarded by the first interface. For example, the processor stores the input/output command in the second memory such that the first memory controller may further obtain the input/output command from the second memory. For another example, the processor sends the input/output command to the first memory controller through the first interface. For another example, the input/output command is the input/output command table.

According to a second aspect, a secure data transfer system is provided, including the apparatus according to the first aspect or any optional implementation in the first aspect, and further including a first memory. The first memory includes a second interface, coupled to a first interface, and configured to receive ciphertext data from the first interface when a write operation is performed on the first memory, or send the ciphertext data to the first interface when a read operation is performed on the first memory, a storage medium configured to store the ciphertext data, and a first memory controller configured to perform receiving the ciphertext data from the second interface and writing the ciphertext data into the storage medium, or reading the ciphertext data from the storage medium and sending the ciphertext data to the second interface. Optionally, the system further includes a second memory configured to store plaintext data. For example, the system is included in a terminal device. For example, the system may be a circuit board or a chip set.

According to a third aspect, a secure data transfer method is provided, including running driver software to generate cryptography information, in a cryptography device, obtaining a current cryptography parameter based on the cryptography information, and performing a cryptography operation using the current cryptography parameter, where the cryptography operation includes encrypting plaintext data to obtain ciphertext data, or decrypting the ciphertext data to obtain the plaintext data, and performing, using a first interface, ciphertext data exchange with a first memory controller in an external first memory, where the ciphertext data exchange includes sending the ciphertext data from the cryptography device to the first memory controller when a write operation is performed on the first memory, or sending the ciphertext data from the first memory controller to the cryptography device when a read operation is performed on the first memory.

According to a fourth aspect, a device is provided, for example, a terminal device, including the apparatus according to the first aspect or any optional implementation in the first aspect, or including the system according to the second aspect.

For more specific solutions, refer to the following specific implementations of the present disclosure.

DESCRIPTION OF EMBODIMENTS

Figure 1:
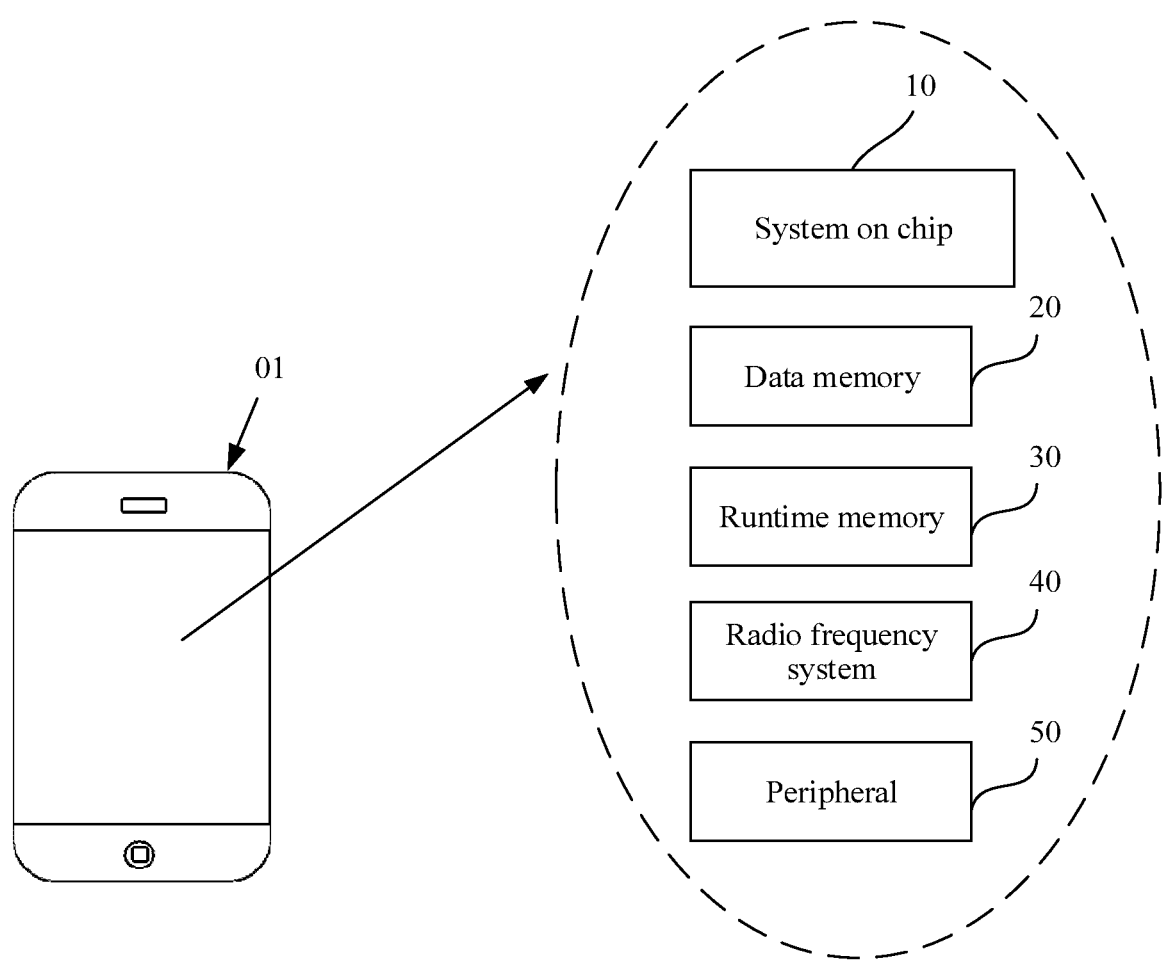
FIG. 1 is a schematic structural diagram of an electronic device according to an embodiment of the present disclosure.

To make the purpose, technical solutions, and advantages of embodiments of this application clearer, the following clearly describes the technical solutions of the embodiments of this application with reference to the accompanying drawings in the embodiments of this application. For ease of understanding, the following first explains some terms in the embodiments.

A system on chip is a chip, and is a system formed by integrating components with a plurality of functions on one chip. The chip is also referred to as a semiconductor chip, and is a set of integrated circuits manufactured on an integrated circuit substrate (which is usually made from a semiconductor material, for example, silicon) through an integrated circuit technology. An external layer of the semiconductor chip is usually encapsulated by a semiconductor encapsulation material. The integrated circuit may include various types of functional devices. Each type of functional device may include a logic gate circuit, a metal-oxide-semiconductor (MOS) transistor, or a transistor, for example, a bipolar transistor or a diode, and may also include another component, for example, a capacitor, a resistor, or an inductor. The functional device may operate independently or operate under an action of necessary drive software, and may implement various types of functions such as communication, operation, or storage.

A processor is a computing device configured to run software to perform computing processing. The processor may include at least one type of the following components: a CPU, a digital signal processor (DSP), a microprocessor, an artificial intelligence (AI) processor, a microcontroller unit (MCU), or a graphics processing unit (GPU). The processor may include one or more cores configured to run the software. For example, the processor may be a single-core processor or a multi-core processor, or the processor may further selectively include a necessary hardware accelerator. For example, the hardware accelerator or the one or more cores inside the processor may be integrated in a same chip or located on a plurality of different chips. In the embodiments, a cryptography device in a form of the processor and the hardware accelerator may be integrated in a same system on chip.

The hardware accelerator is a component that implements logic computation or processing only using a hardware circuit without running the software. The hardware accelerator includes an application-specific integrated circuit (ASIC), a field-programmable gate array (FPGA), a logic computation unit, a logic gate array, an algorithm circuit, or the like. Alternatively, the hardware accelerator may further selectively include a necessary analog circuit. This is not limited in the embodiments.

The software is a set of program code run by the processor, and the program code may include a large quantity of code instructions. For example, the software may form a computer program product, and may include operating system software, application software, open-source software, driver software, or the like.

Data includes various types of binary data that can be processed by a computer, the processor, or the hardware accelerator, and includes but is not limited to the program code, an operation result, user data, system data, or the like. For example, the user data may be image processing, audio data, game data, document data, personal information, or the like. For another example, the program code may include some or all of the software such as the operating system software, the application software, the open-source software, or the driver software. Further, plaintext data is unencrypted initial data. Ciphertext data is data obtained after the plaintext data is encrypted, and the plaintext data may be obtained after the ciphertext data is decrypted.

A cryptography operation is a technology in which information or the data is processed by a key to ensure security. The cryptography operation includes at least one of encryption or decryption. The processing may further require a cryptography vector, also referred to as an initialization vector.

In the embodiments of this application, the used "at least one" means one or any combination of more than one. For example, "at least one of A or B" means A, B, or a combination of A and B. "First" and "second" are merely used to distinguish between different subjects or targets, and are not used to limit a specific technical feature of the subject or target. The term "couple" is used to express an inter-connection between different components, for example, an electrical connection or a communication connection. The inter-connection may include a direct connection through a connection line and an indirect connection through a third-party component.

FIG. 1 is a schematic structural diagram of an electronic device 01 according to an embodiment of the present disclosure. The electronic device 01 may be a terminal device with a communication capability, also referred to as user equipment (UE). The electronic device 01 may be further an access terminal, a terminal unit, a terminal station, a mobile station, a mobile console, a remote station, a remote terminal, a mobile device, a wireless communications device, a terminal agent, a terminal apparatus, or the like. The access terminal may be various types of products: a cellular phone, a cordless phone, a Session Initiation Protocol (SIP) phone, a wireless local loop (WLL) station, a vehicle-mounted device, a portable device, and a handheld device, for example, a personal digital assistant (PDA) and the like, with a wireless communication function. For example, the electronic device 01 is a mobile phone. Alternatively, the electronic device 01 may be an electronic device, for example, a game console, without the communication capability. This is not limited in this embodiment.

The following uses only an example in which the electronic device 01 is the mobile phone for description. The electronic device 01 includes a system on chip 10, a data memory 20, a runtime memory 30, a radio frequency system 40, and a peripheral 50. The system on chip 10 may have a basic processing capability, and perform computing processing, graphics processing, voice processing, communication algorithm processing, artificial intelligence processing, various types of application processing, and the like. For example, the system on chip 10 may include different processors, such as a CPU or a GPU, and may further include a voice subsystem, a power control system, a communications processing system, a codec, a display subsystem, an image signal processor (ISP), and the like. The communications processing system can support various types of wireless communications protocols. For example, the wireless communications protocols may include but are not limited to a Global System for Mobile Communications (GSM) protocol, a code-division multiple access (CDMA) protocol, a wideband CDMA (WCDMA) protocol, a Long-Term Evolution (LTE) protocol, an Internet of things (IoT) or Narrowband IoT (NB-IoT)) protocol, or a $5^{th}$ generation (5G) mobile communications protocol.

In addition to the system on chip 10 configured to perform operation processing, the electronic device 01 further includes the data memory 20. The data memory 20 is a main memory, and is configured to store various types of data of the electronic device 01, such as application software, operating system software, personal data, or shared data. The data memory 20 may be a non-volatile memory, and data in the data memory 20 is not lost after the data memory 20 is powered off. For example, the data memory 20 is a high-speed flash memory.

Further, the electronic device 01 includes the runtime memory 30. The runtime memory 30 is configured to store temporary data of the system on chip 10, for example, is configured to load running software or store various types of intermediate data or temporary data generated by the running software. The runtime memory 30 may be a volatile memory, including a dynamic random-access memory (RAM) (DRAM), for example, a double data rate (DDR) synchronous DRAM (SDRAM). When one or more processors in the system on chip 10 run software, the software is loaded from the data memory 20 to the runtime memory 30, and the runtime memory 30 provides, for the loaded software, storage space required for running the software. For example, the runtime memory 30 may store related software, intermediate data, a running instruction, or the like. When the one or more processors ends running the software, various running results or data that needs to be stored may be stored from the runtime memory 30 to the data memory 20, to avoid a loss of related data.

Further, the electronic device 01 includes the radio frequency system 40, and the radio frequency system 40 cooperates with the communications processing system in the system on chip 10, to implement receiving and sending of a communications signal. The radio frequency system 40 includes but is not limited to a radio-frequency integrated circuit (RFIC), a radio frequency front-end (RFFE), an antenna, or the like. In addition, the electronic device 01 further includes the other necessary peripheral 50 that cooperates with the system on chip. The peripheral 50 may include a touchscreen, a display, various data interfaces such as an input or output interface, a battery, a power management unit (PMU), a camera, a fingerprint recognition device, a keyboard including a volume control key or another key, a microphone, or various sensors.

Figure 2:
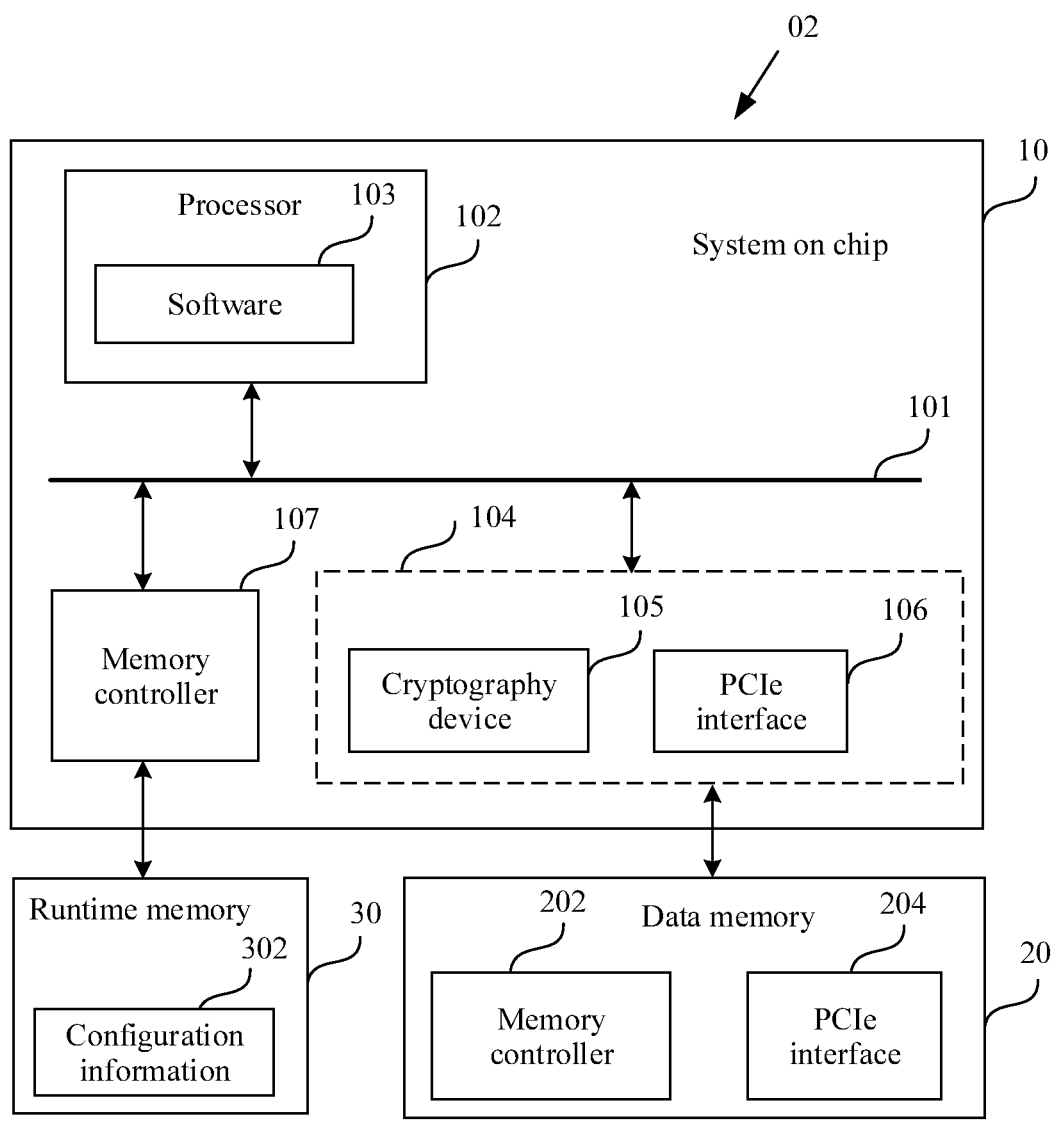
FIG. 2 is a schematic structural diagram of a system located in an electronic device according to an embodiment of the present disclosure.

To clearly describe this embodiment, with reference to FIG. 2, an architectural diagram of a system 02 located inside an electronic device 01 is described. The system 02 may be a chip set or a circuit board including a system on chip 10. The system 02 may include the system on chip 10, the data memory 20, and the runtime memory 30 that are in FIG. 1. The system on chip 10 includes a bus 101, a processor 102, a connector 104, and a memory controller 107. The processor 102, the connector 104, and the memory controller 107 are all coupled to the bus 101. The bus 101 is configured to connect components in the system on chip 10 such that different components are coupled to implement data or control information exchange. As described in the foregoing embodiment, the processor 102 may a processor of any type, and one implementation of the processor 102 is a CPU. The CPU includes but is not limited to a processor that uses an advanced reduced instruction set computing (RISC) machine (ARM) architecture, an INTEL X86 architecture, or a million instructions per second (MIPS) architecture. The processor 102 runs software 103, and implements control of another component in the system on chip 10, for example, control over the connector 104, the memory controller 107, a direct memory access (DMA) device, a GPU, a voice subsystem, a power control system, a communications processing system, a codec, a display subsystem, or an ISP. The control includes adjusting power consumption, adjusting a voltage, adjusting a current, adjusting a clock, control of enabling and disabling, and the like. The software 103 run by the processor 102 may include operating system software such as an ANDROID system, and further include various types of application software, open-source software, various types of driver software, and the like. Data or an intermediate operation result generated by the software 103 run by the processor 102 may be temporarily stored in the runtime memory 30.

The system on chip 10 in FIG. 2 may be coupled to the runtime memory 30 and the data memory 20. The data memory 20 stores various types of data, such as personal data or program code software. Optionally, when the electronic device 01 is powered on, the software 103 run by the processor 102 in the system on chip 10 and to-be-processed data may be from the data memory 20. Therefore, the data memory 20 is a non-volatile memory that can store data for a long time. To ensure security of the personal data or software data in the data memory 20, related data may be stored in the data memory 20 in a form of ciphertext data. That is, the various types of data are encrypted to form the ciphertext data before being stored in the data memory 20. For example, the data memory 20 is an NVMe memory. In addition to a storage medium (not shown in the figure) configured to store data, the data memory 20 further includes a memory controller 202. The memory controller 202 is configured to control reading and writing of the storage medium. Therefore, there is no need to dispose, in the system on chip 10, a memory controller of the data memory 20. In this embodiment, only the NVMe memory is used as an example for description. The data memory 20 may alternatively be another type of memory that is equipped with a built-in memory controller. As long as the data memory 20 includes the built-in memory controller, the system on chip 10 does not need to be specially equipped with a built-in memory controller that is configured to control data reading and data writing in the data memory 20 such that implementation complexity is low and extensibility is high.

To implement data exchange between the system on chip 10 and the data controller 20, the system on chip 10 includes the connector 104. The connector 104 is coupled to the bus 101, and is coupled to the external data memory 20. The connector 104 may include a cryptography device 105 and a PCIe interface 106. The connector 104 or the cryptography device 105 may be integrated into the system on chip 10 in a form of an intellectual property (IP) core. Because the data memory 20 has the memory controller 202, the connector 104 does not need to include a dedicated memory controller, and may support only a universal PCIe interface protocol, to increase the extensibility and reduce the complexity. The cryptography device 105 is configured to perform a cryptography operation. The cryptography operation includes at least one of encryption or decryption, to encrypt, into the ciphertext data, plaintext data that is to be written into the data memory 20, or decrypt, into the plaintext data, the ciphertext data read from the data memory 20. Therefore, the cryptography device 105 may be considered to have at least one function of the encryption or the decryption. Correspondingly, the data memory 20 further includes a PCIe interface 204. The PCIe interface 204 is coupled to the PCIe interface 106 in the system on chip 10. The system on chip 10 and the data memory 20 may perform ciphertext data exchange through the two PCIe interfaces. In an actual implementation, an interface configured to couple the system on chip 10 and the data memory 20 may be another interface other than the PCIe interface, that is, a type of the interface may be flexibly selected, and the interface does not need to support a specific memory protocol. Therefore, the interface has the high extensibility, and is easy to implement. The PCIe interface in this embodiment is a standard data transmission channel, and the PCIe interface may include a controller and a physical layer device. The controller and the physical layer device jointly support interface transmission that is based on a PCIe protocol. For a specific implementation of the PCIe interface, refer to other approaches. The PCIe interface is used as an example for description in all subsequent embodiments. This type of interface has the high extensibility and a high transmission speed, and can better meet a system requirement. In this embodiment, data transfer is implemented between the system on chip 10 and the data memory 20, and the cryptography operation is performed by the dedicated cryptography device. Therefore, all data transmitted on the PCIe interface 106 is the ciphertext data. This avoids exposure of data content, and is secure and fast.

When data is transferred between the system on chip 10 and the data memory 20, the data may be written into the data memory 20, or the data may be read from the data memory 20. During the data writing, the cryptography device 105 in the connector 104 may obtain the plaintext data from a data source through the bus 101, and encrypt the plaintext data to obtain the ciphertext data. The ciphertext data is sent, through the PCIe interface 106, to the PCIe interface 204 inside the data memory 20 such that the PCIe interface 204 forwards the ciphertext data to the memory controller 202, and the memory controller 202 writes related ciphertext data into an address of a corresponding storage medium. During the data reading, a data stream direction is opposite. The memory controller 202 obtains the ciphertext data from the address of the corresponding storage medium, and sends the ciphertext data to the PCIe interface 204. The PCIe interface 204 sends the ciphertext data to the PCIe interface 106 in the system on chip 10. The cryptography device 105 further decrypts the ciphertext data to obtain the plaintext data, and the restored plaintext data is sent to a data destination through the bus 101.

In an example, the data source configured to provide the to-be-stored plaintext data when the data memory 20 is written or the data destination configured to receive the restored plaintext data when the data memory 20 is read may be a component in the system on chip 10, or may be another external component. In an embodiment, the data source or the data destination is the runtime memory 30. The runtime memory 30 may be, for example, a DRAM configured to load the software 103 run by the processor 102, to provide storage space required for running the software. In addition, the runtime memory 30 may further store various types of control instructions, intermediate data, or the like generated when the software 103 is run. Alternatively, the runtime memory 30 may be another storage device other than the DRAM. In this embodiment, the DRAM is used as an example for description. The processor 102 runs the software 103 to generate various types of running results. In addition, the running result may also be generated by processing or an operation of another component. Any running result may include various types of plaintext data and is temporarily stored in the runtime memory 30. When the system on chip 10 needs to write the plaintext data from the runtime memory 30 into the data memory 20, the related data may be encrypted by the cryptography device 105 in the connector 104 to obtain the ciphertext data, to implement secure storage. When the system on chip 10 needs to load the data in the data memory 20 into the runtime memory 30, the related ciphertext data is obtained, and is decrypted by the cryptography device 105, to obtain the plaintext data. When being loaded to the runtime memory 30, the related ciphertext data may be processed by the processor 102 by running the software 103, or may be processed by the other component. To control reading or writing of the runtime memory 30, the system on chip 10 further includes the memory controller 107. The memory controller 107 reads the plaintext data from the runtime memory 30, and provides the plaintext data to the connector 104 through the bus 101, to facilitate a subsequent write operation on the data memory 20. Instead, the memory controller 107 writes, into the runtime memory 30, the plaintext data that is read from the data memory 20 and that is decrypted by the connector 104.

In the foregoing embodiment, there are two different types of memories. The memory controller 107 of the runtime memory 30 is disposed in the system on chip 10. The memory controller 202 of the data memory 20 is located inside the data memory 20 instead of the system on chip 10. The data transfer between the two memories needs to pass through the connector 104 in the system on chip 10, and the cryptography operation is performed to ensure security. Therefore, the runtime memory 30 mainly includes the storage medium, and does not include the memory controller. However, the data memory 20 is equipped with the built-in dedicated memory controller. Although this embodiment of the present disclosure is mainly described using the data memory 20 and the runtime memory 30 as an example, it may be understood that after being simply transformed, the solution in this embodiment is also applicable to data transfer between any two memories. Either of the memories or both memories may include the built-in memory controller, and security of the data transfer, for example, the data reading or the data writing, can be ensured. The memory may be the volatile memory or the non-volatile memory, and a memory protocol supported by the memory is not limited. Even if the memory protocol or a memory type changes, there is no need to greatly modify the system on chip 10. This solution has the high extensibility, and is easy to implement.

Figure 3:
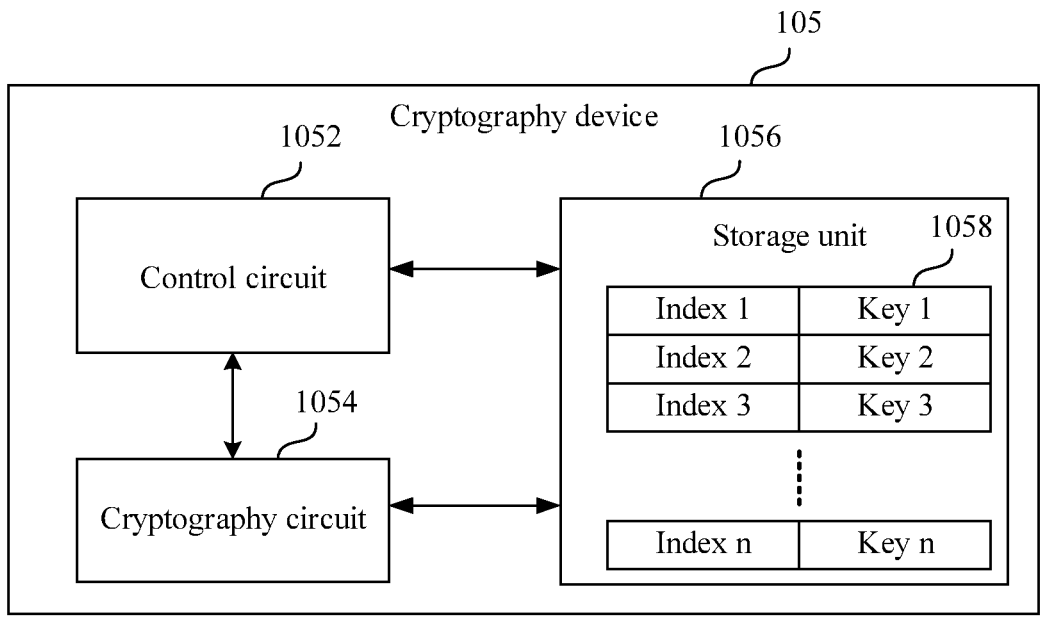
FIG. 3 is a schematic structural diagram of a cryptography device according to an embodiment of the present disclosure.

As shown in FIG. 3, a schematic structural diagram of the cryptography device 105 is further provided. The cryptography device 105 includes a control circuit 1052, a cryptography circuit 1054, and a storage unit 1056. The three components may include a large quantity of logic gate arrays, transistors, or circuits such that the cryptography device 105 forms a hardware accelerator, to provide an efficient cryptography operation and ensure the security. The control circuit 1052 is configured to obtain a current cryptography parameter required for encrypting/decrypting current data. The cryptography circuit 1054 implements the cryptography operation using the current cryptography parameter. The cryptography operation includes but is not limited to at least one of encryption or decryption. Therefore, the cryptography circuit 1054 is a circuit including an encryption or decryption function. The storage unit 1056 may store a specific cryptography parameter, and may include any component, for example, a RAM, a buffer, or a register, that may be configured to store data. In an embodiment, the processor 102 generates configuration information 302 by running the software 103, and the configuration information 302 may be stored in the runtime memory 30. The configuration information 302 may include cryptography information that is used to configure a cryptography parameter required for encryption/decryption, for example, include a key index table 3021 shown in FIG. 4. The key index table 3021 includes a plurality of storage addresses, and a key index and a cryptography vector that are corresponding to each storage address. The control circuit 1052 may obtain, through the bus 101, the key index table in the runtime memory 30. The control circuit 1052 searches the table using a current storage address as an input, to obtain a current key index and a current cryptography vector that are corresponding to the current storage address. The current storage address is an address related to the data transfer between the data memory 20 and the runtime memory 30. The current storage address may be an address of the ciphertext data in the storage medium in the data memory 20, or an address of the plaintext data in the runtime memory 30. Further, the control circuit 1052 searches the storage unit 1056 using the obtained current key index. The cryptography parameter stored in the storage unit 1056 further exists in a form of a key lookup table 1058. As shown in FIG. 3, the key lookup table 1058 includes a plurality of key indexes and a key corresponding to each key index. The control circuit 1052 finds, in the table 1058 using the current key index, a corresponding current key as a key required for the encryption/decryption. The control circuit 1052 further provides the obtained current key and the obtained current cryptography vector for the cryptography circuit 1054. The cryptography circuit 1054 performs the cryptography operation based on the current key and the current cryptography vector. A used cryptography algorithm may include but is not limited to an AES algorithm, and a cryptography algorithm used is not limited in this embodiment. Because the control circuit 1052 and the cryptography circuit 1054 are hardware accelerators, a computing processing speed can be improved.

In the foregoing embodiment, because the key index table 3021 configured by the software 103 includes only the key index and the cryptography vector, the processor 102 or the software 103 does not directly obtain the key, and need the control circuit 1052 to further obtain the key based on searching the key lookup table 1058 in the storage unit 1056. The storage unit 1056 is the hardware accelerator and cannot be read by the software. Therefore, security of key obtaining is improved.

Figure 5:
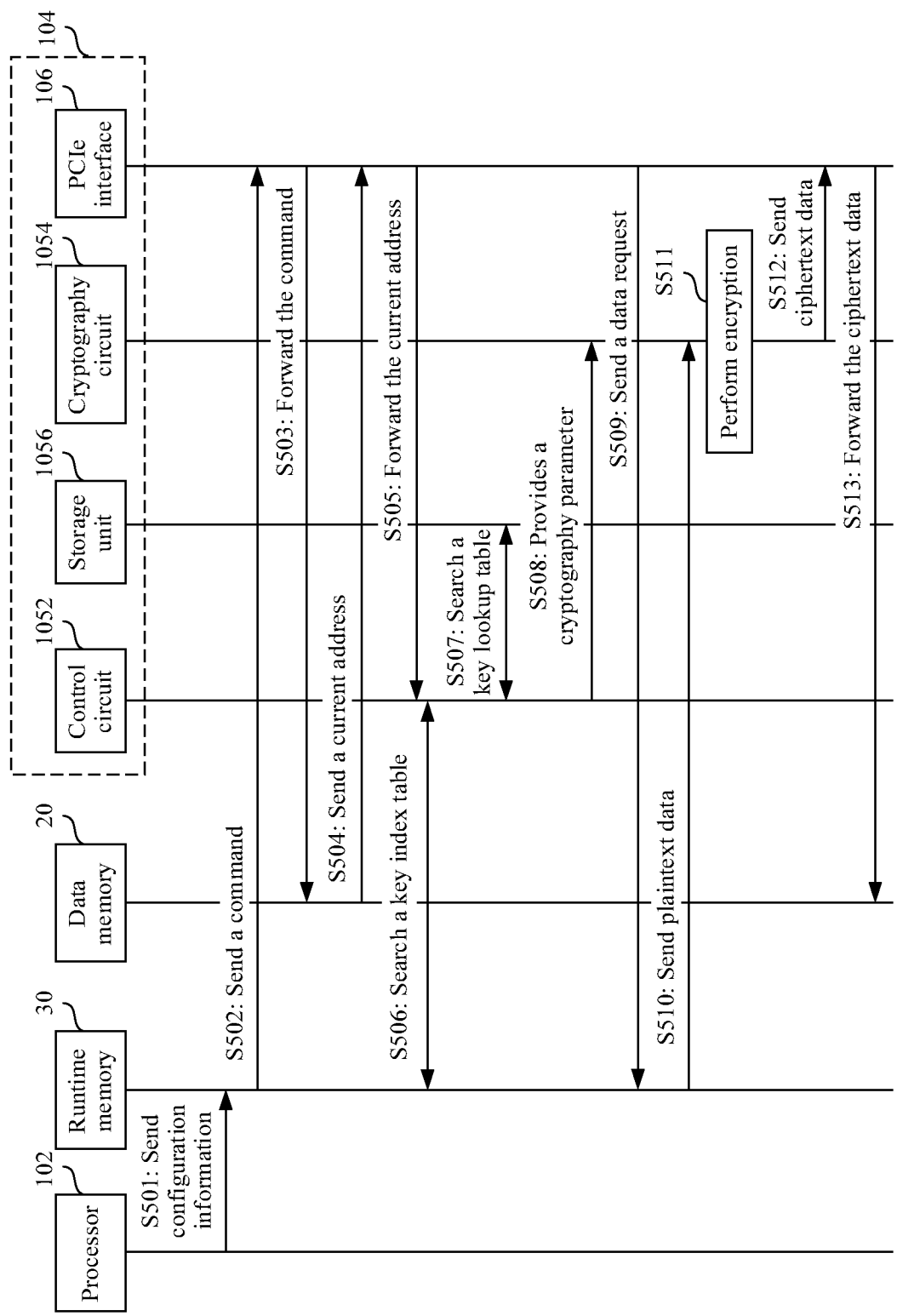
FIG. 5 is a schematic flowchart of transferring data from a runtime memory to a data memory according to an embodiment of the present disclosure.

In an optional embodiment, as shown in FIG. 5, a method for transferring data from a runtime memory 30 to a data memory 20 is provided. In this embodiment, the runtime memory 30 that is read is a source memory, and the data memory 20 that is written is a destination memory. In S501, a processor 102 generates configuration information 302 by running software 103, and configures the configuration information 302 in the runtime memory 30. In addition, the processor 102 may update and maintain the configuration information 302 in real time. The configuration information 302 may be provided for a memory controller 107 through a bus 101, and the memory controller 107 writes the configuration information 302 into the runtime memory 30 to complete configuration. The configuration information 302 may include cryptography information, for example, include a key index table 3021, and is used to configure a cryptography parameter required for a cryptography operation. The configuration information 302 may further include an input/output (I/O) command used for data transfer. The I/O command may exist in a form of a command table, indicating information required for transferring the data to the data memory 20. The information may include an address of the data that needs to be read from the runtime memory 30, an address of a storage medium that is in the data memory 20 and into which the data needs to be written, a length of operated data, and the like. The command table may be a table that meets a specific memory protocol, for example, an SGL or a PRP table. For specific forms of the two tables, refer to descriptions in the other approaches. The specific forms of the two tables are not described in detail in this embodiment. The runtime memory 30 may separately store the key index table 3021 in the configuration information 302 and the I/O command used for the data transfer, or may store the key index table 3021 and the I/O command together. This is not limited in this embodiment.

In S502, a PCIe interface 106 obtains, through the memory controller 107 and the bus 101, the I/O command stored in the runtime memory 30. For example, the PCIe interface 106 may include a control data moving capability similar to a data transfer control capability of a DMA device, to control data movement between different components. Optionally, the PCIe interface 106 in each embodiment may be replaced with another type of interface that does not have the data transfer control capability. In this case, the interface may send a request to the processor 102 or a DMA device coupled to the bus 101. Therefore, the processor 102 or the DMA device performs data movement control, to transfer the I/O command from the runtime memory 30 to the PCIe interface 106.

In S503, the PCIe interface 106 forwards the I/O command to the data memory 20. The data memory 20 receives the I/O command through a PCIe interface 204, and forwards the I/O command to a memory controller 202. Therefore, the memory controller 202 can control, based on the I/O command, writing of the storage medium that is in the data memory 20. Further, the memory controller 202 may generate a write command including a current storage address. In an alternative implementation, different from that the memory controller 202 obtains, through S502 and S503, the I/O command that is stored in the runtime memory 30 by the processor 102, the processor 102 may send the I/O command to the memory controller 202 through the PCIe interface 106. A manner in which the memory controller 202 obtains the I/O command generated by the processor 102 is not limited in this embodiment.

In S504, the data memory 20 sends the current storage address indicated in the I/O command to the PCIe interface 106, for example, sends the write command including the current storage address. The current storage address may be an address that needs to be read from the runtime memory 30 or an address that is to be written into the data memory 20. For example, this embodiment uses the address that needs to be read from the runtime memory 30, that is, a source address, as an example for description. In S505, the PCIe interface 106 forwards the current storage address to a control circuit 1052.

Figure 4:
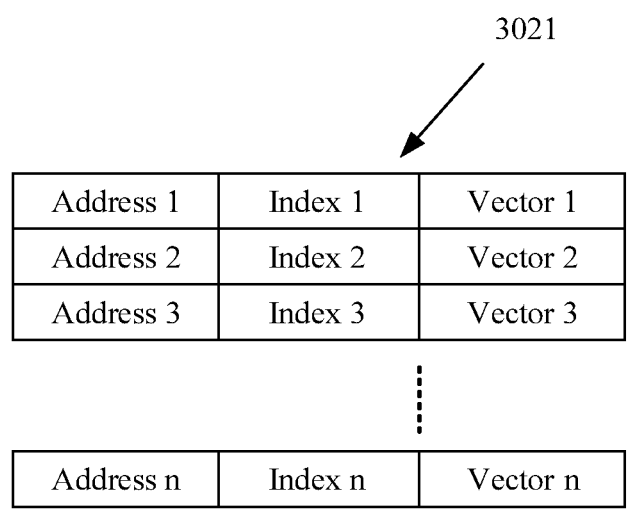
FIG. 4 is a schematic diagram of a key index table according to an embodiment of the present disclosure.

In S506, the control circuit 1052 may further use the current storage address as an input to search the key index table 3021 stored in the runtime memory 30. As described in S501, the key index table 3021 is generated by the processor 102 running the software 103 and is temporarily stored in the runtime memory 30 as the configuration information 302. The control circuit 1052 may obtain, from the runtime memory 30 and through the bus 101 and the memory controller 107, the key index table 3021 in the configuration information 302. For example, the key index table 3021 is shown in FIG. 4, and includes an address 1, an address 2, . . . , and an address n. For example, n is 16, that is, there are 16 addresses and corresponding cryptography parameters. Alternatively, a quantity of n may be another value, for example, 32 or 128. In this embodiment, only 16 is used as an example. Each address is corresponding to an address of a part of unencrypted plaintext data in the runtime memory 30. A unit of the part of plaintext data corresponding to each address may be a page, or may be another storage unit. The following embodiment uses an example in which the page is used as the storage unit for description. It is assumed that the current storage address is the address 2, the control circuit 1052 obtains, by searching the key index table 3021, a key index 2 and a cryptography vector 2 that are corresponding to the current storage address 2. It may be understood that a cryptography vector is the required cryptography parameter as well as a key, but a security requirement of the cryptography vector is lower than a security requirement of the key. In some alternative application scenarios of this embodiment, the cryptography operation may not use the cryptography vector. Therefore, the key index table 3021 may include only a key index but not the cryptography vector. In this example, the cryptography vector is introduced to further improve security, and the cryptography vector is also referred to as an initialization vector (IV). Because the control circuit 1052 searches the key index table 3021 to obtain the index 2, in S507, the control circuit 1052 further searches a key lookup table 1058 in a storage unit 1056 using the index 2, to obtain a cryptography key 2 corresponding to the index 2.

In S508, the control circuit 1052 provides the key 2 and the cryptography vector 2 as the cryptography parameters for a cryptography circuit 1054. In addition, in S509, the PCIe interface 106 sends a data request to the runtime memory 30 through the bus 101 and the memory controller 107. The data request is generated based on the write command received in S504, and may include the address of the data that needs to be read from the runtime memory 30. In S510, the memory controller 107 reads, based on the address, the plaintext data from the runtime memory 30, and transmits the plaintext data to the cryptography circuit 1054. As described above, the plaintext data is one page of data or a plurality of pages of data. It should be noted that, in the embodiment shown in FIG. 5, an execution sequence of S509 and S510 is variable. S509 and S510 may be performed before S505, or may be performed synchronously with S505 to S508. That is, for the cryptography circuit 1054, a sequence of obtaining of the to-be-encrypted plaintext data and obtaining of the cryptography parameter is not strictly limited.

In S511, the cryptography circuit 1054 encrypts the plaintext data using the cryptography parameter obtained in S508, to obtain ciphertext data. An algorithm used for the encryption/decryption may be an AES-cipher block chaining (AES-CBC) algorithm or an AES-XEX-based tweaked-codebook mode with ciphertext stealing (AES-XTS) algorithm, that is, a current key and a current cryptography vector are used to perform encryption. It may be understood that a more simplified algorithm may also be used herein. To be specific, the current cryptography vector is omitted, and only the key is used to perform the encryption. Operation complexity is reduced, but the security is slightly reduced. In S512, the cryptography circuit 1054 provides the ciphertext data for the PCIe interface 106. In S513, the PCIe interface 106 forwards the ciphertext data to the data memory 20. In the data memory 20, the PCIe interface 204 is configured to receive the ciphertext data. The memory controller 202 is configured to determine, based on the I/O command received in S503, a write address of the storage medium that is in the data memory 20 and into which the ciphertext data needs to be written, and further write the ciphertext data into the address. The PCIe interface 106 has the data transfer control capability of the DMA device. Optionally, the PCIe interface 106 in each embodiment may be replaced with the other type of interface that does not have the data transfer control capability. In this case, the interface may send the request to the processor 102 or the DMA device coupled to the bus 101. Therefore, the processor 102 or the DMA device performs the data movement control, to forward the ciphertext data. The DMA device or the processor 102 is configured to control data transfer that is through the bus 101 and that is between the memory controller 107 and the memory controller 202, to implement data exchange between different memories.

Figure 6:
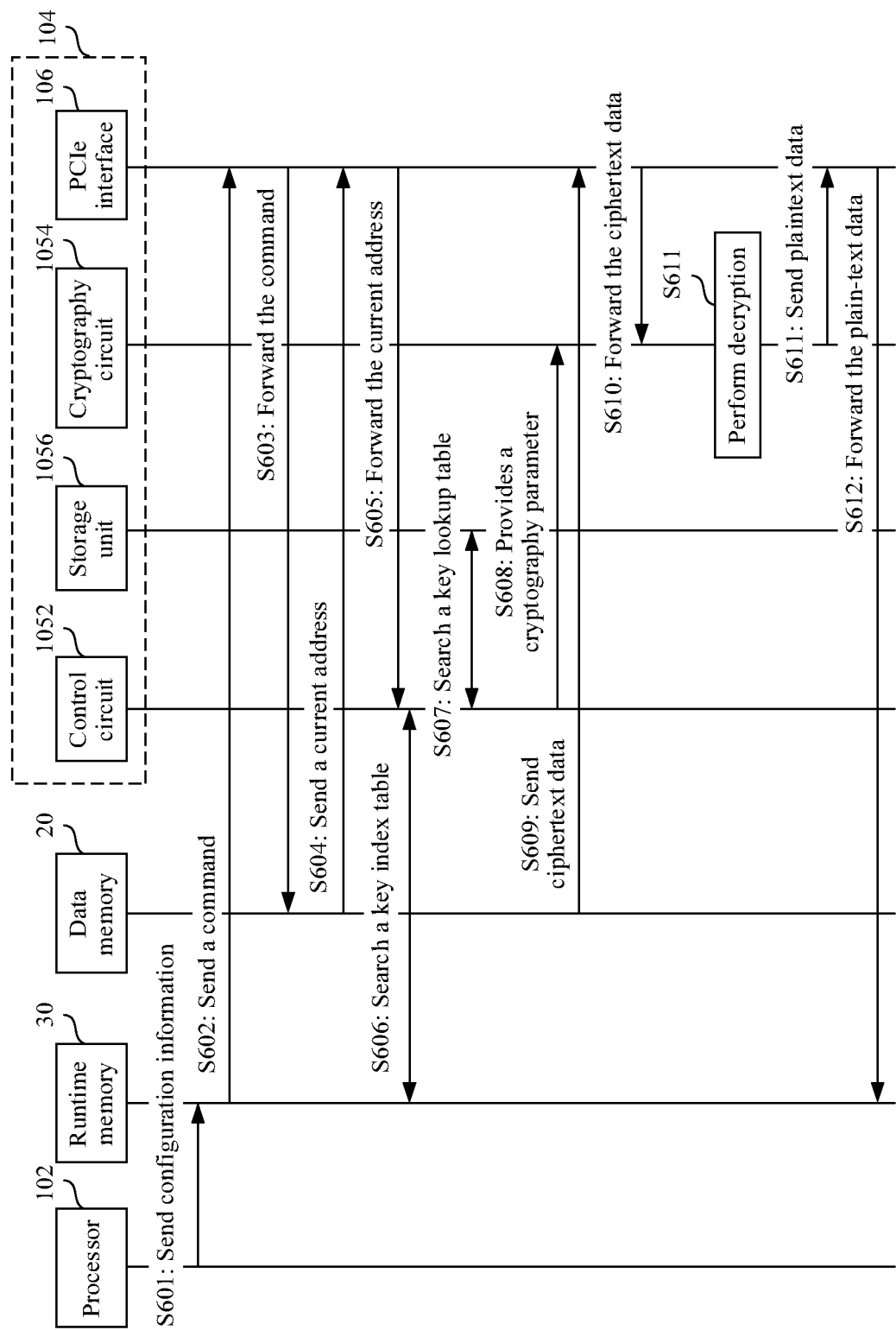
FIG. 6 is a schematic flowchart of transferring data from a data memory to a runtime memory according to an embodiment of the present disclosure.

The foregoing embodiment in FIG. 5 shows that the data is transferred from the runtime memory 30 to the data memory 20, that is, a process in which temporary data or intermediate data that is being processed by the processor 102 is written into the data memory 20 that can store content for a long time In another embodiment, as shown in FIG. 6, a procedure method for transferring data from a data memory 20 to a runtime memory 30 is shown. FIG. 6 shows a process in which the data that is stored for a long time is transferred out and loaded to the runtime memory 30 such that a processor 102 can subsequently use the loaded data. Different from FIG. 5, in this embodiment, the data memory 20 that is read is a source memory, and the runtime memory 30 that is written is a destination memory. S601 to S608 are similar to S501 to S508 in FIG. 5. For example, in S601, configuration information 302 generated by the processor 102 by running software 103 also includes a key index table 3021. A difference is that an I/O command included in the configuration information 302 is used to indicate to transfer the data from the data memory 20 to the runtime memory 30, and not to transfer the data in the opposite direction. Further, the I/O command may still exist in a form of a command table, including an address of the data that needs to be read from the data memory 20, an address of a storage medium that is in the runtime memory 30 and into which the data needs to be written, a length of operated data, and the like. Further, based on FIG. 5, in a procedure corresponding to FIG. 6, the processor 102 may update and maintain, in real time, the configuration information, that is, the I/O command, generated in S501 in FIG. 5, to obtain a new I/O command. Further, an address that is written into the runtime memory 30 in this embodiment may be different from the address that is read from the runtime memory 30 in the embodiment in FIG. 5. Therefore, the processor 102 implements, by running the software 103, modification of the address that is in the runtime memory 30 and that is in the I/O command.

In S604, similar to S504, the data memory 20 obtains a current storage address indicated in the I/O command, and sends the current storage address to a PCIe interface 106. However, because an address used by the runtime memory 30 to store plaintext data may have been changed, the current storage address may be different from the address in S504. However, keys, key indexes, or cryptography vectors that are pointed to by the two addresses before and after the address used by the runtime memory 30 to store the plaintext data is changed are the same. That is, the processor 102 also updates and maintains, in real time, a key index table 3021 or a key configuration table 3025 in the configuration information 302. However, when the I/O command is updated, the address of the plaintext data in the runtime memory 30 changes. In this case, an address in the key index table 3021 or an address in the key configuration table 3025 that is corresponding to the plaintext data is also updated. This ensures that an update on an address does not affect a key or a cryptography vector to which the address points. For example, for the key index table 3021 in FIG. 4, when a procedure corresponding to FIG. 5 is executed, an address used as a table lookup input is an address 3 in the runtime memory 30 such that the data is read from the address 3 and written into the data memory 20. In the procedure corresponding to FIG. 6, an update on the I/O command in the configuration information 302 causes the address 3 in the runtime memory 30 to change, for example, to change to 3'. In this case, the data in the data memory 20 is reloaded or written to an address 3'. An address 3 in the key index table 3021 is also updated to the address 3' such that a cryptography parameter obtained through a table lookup in the procedure in FIG. 6 is still the same as a cryptography parameter obtained last time. In addition, ciphertext data can be successfully decrypted, to obtain the plaintext data. In the foregoing example, the address in the runtime memory 30 is used as an example. Alternatively, if an address in the data memory 20 is used as the table lookup input, the foregoing solution may be used to update the I/O command in the configuration information 302 in real time, and synchronously update the key index table 3021 or the key configuration table 3025. This ensures that a change of an address of the ciphertext data in the data memory 20 does not affect a cryptography parameter to which the address points.

Further, because in S603, the PCIe interface 106 forwards the I/O command to the data memory 20, the data memory 20 may provide, in subsequent S609, the ciphertext data for the PCIe interface 106 based on the I/O command. Further, a PCIe interface 204 in the data memory 20 may receive the I/O command in S603 and forward the I/O command to a memory controller 202. The memory controller 202 may read the ciphertext data in the storage medium of the data memory 20 based on a read address indicated by the I/O command, to forward the ciphertext data to the PCIe interface 204. The PCIe interface 204 is configured to couple to the PCIe interface 106 such that the ciphertext data is sent to the PCIe interface 106 in S609. Further, in S610, the PCIe interface 106 forwards the received ciphertext data to a cryptography circuit 1054.

In S611, the cryptography circuit 1054 decrypts, using the cryptography parameter obtained in S608, the ciphertext data obtained in S609. A used decryption algorithm is, for example, an inverse operation of an encryption algorithm that can be used in the embodiment in FIG. 5, to obtain the plaintext data. For example, the decryption algorithm is an AES-CBC algorithm or an AES-XTS algorithm. In S611, the cryptography circuit 1054 sends the plaintext data to the PCIe interface 106 such that the PCIe interface 106 further forwards the plaintext data to the runtime memory 30 in S612. In S612, the PCIe interface 106 may forward the plaintext data to the memory controller 107 through the bus 101. The memory controller 107 is configured to write the plaintext data into an address to which the plaintext data is to be written in the runtime memory 30.

It should be noted that, in the embodiment in FIG. 5 or FIG. 6, the input used for searching the key index table 3021 is an address of a part of unencrypted plaintext data in the runtime memory 30. A plurality of addresses included in the key index table 3021 are respectively addresses of a plurality of parts of plaintext data stored in the runtime memory 30. Each part of plaintext data is corresponding to one page of data or a plurality of pages of data and has a corresponding cryptography parameter. Any part of data that is to be processed is uniquely corresponding to a pair of cryptography parameters, that is, a key and a cryptography vector. The key and the cryptography vector are uniquely corresponding to a current storage address of the part of data such that different data corresponding to different storage addresses has different keys and cryptography vectors. This further improves security. An input used by a control circuit 1052 for a table lookup is the address of the plaintext data in the runtime memory 30. Because the key index table 3021 read by the control circuit 1052 from the runtime memory 30 through the bus 101 and the memory controller 107 is configured by the software 103 and belongs to a part of the configuration information 302, the software 103 may determine a form of the key index table 3021, and modify the table 3021 by changing a correspondence between a current storage address and a key index. Alternatively, the plurality of addresses included in the key index table 3021 may also be respectively addresses of a plurality of parts of ciphertext data stored in the data memory 20. In this case, the control circuit 1052 may use the address of the ciphertext data in the data memory 20 as the input, to search the key index table 3021. Certainly, the input of the key index table 3021 in this embodiment may not be an address, but is replaced with another label corresponding to a part of data that is to be transferred, for example, a dedicated table lookup identifier, that is, the key index table 3021 may be adaptively changed or adjusted. This is not limited in this embodiment. Certainly, as described in the foregoing embodiment, a more common selection is to directly use the address as an index. In this way, there is no need to specially generate another type of key index, and implementation is simple.

Figure 7:
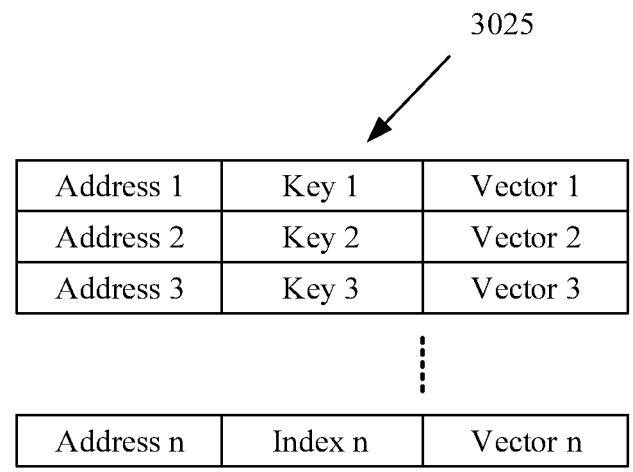
FIG. 7 is a schematic diagram of a key configuration table according to an embodiment of the present disclosure.

In the embodiment in FIG. 5 or FIG. 6, in addition to the key index table 3021 stored in the runtime memory 30, a key lookup table 1058 is stored in a storage unit 1056 included in a cryptography device 105 such that the software 103 cannot directly obtain a key in the storage unit 1056. Further, the storage unit 1056 may be set to be inaccessible to any component other than the cryptography device 105 such that the security is ensured. In another alternative simplified manner implementing key storage, only one table may be set in the runtime memory 30 or the storage unit 1056, and is defined as the key configuration table 3025, to reduce implementation complexity. In this case, the security is slightly reduced, but implementation of a technical objective is not affected. The key configuration table 3025 may be shown in FIG. 7. A difference between the key configuration table 3025 and the key index table 3021 is that the key configuration table 3025 directly includes keys and cryptography vectors corresponding to the plurality of addresses, and does not need to include key indexes. In this solution, the key can be directly obtained by searching only the key configuration table 3025, and a second table lookup in the embodiment in FIG. 5 or FIG. 6 is not required. That is, S506 and S507 in FIG. 5 or S606 and S607 in FIG. 6 may be integrated into one step. The control circuit 1052 uses only the current storage address, for example, the address of the encrypted ciphertext data in the storage medium in the data memory 20 or the address of the unencrypted plaintext data in the runtime memory 30, as the input to search the key configuration table 3025. In this way, current cryptography parameters including a current key and a current cryptography vector are obtained. Alternatively, the cryptography vector is not mandatory in this embodiment, and is only used to improve the security. In an actual cryptography solution, only the key may be used as the cryptography parameter. The key configuration table 3025 may be stored in the runtime memory 30 like the key index table 3021, and may also be stored in the storage unit 1056 like the key lookup table 1058. Optionally, the key configuration table 3025 may also be configured or stored in the runtime memory 30 or the storage unit 1056 by the processor 102 by running the software 103 such that the control circuit 1052 can perform a table lookup operation. This is not limited in this embodiment. When the key configuration table 3025 is stored in the runtime memory 30, the storage unit 1056 in the cryptography device 105 may be omitted. That is, the storage unit 1056 is not a necessary component in the cryptography device 105.

For a solution of configuring the key lookup table 1058 in the storage unit 1056 in FIG. 3, in addition to that the software 103 is prevented from directly obtaining the key, there is an advantage that the processor 102 may flexibly configure the key index table 3021. No matter which part of data in the runtime memory 30 needs to be transferred by the processor 102 to the data memory 20 or to perform reverse data transfer, a key corresponding to the part of data does not need to be directly configured or changed by the processor 102, but the key index table 3021 is directly changed by the processor 102. In this way, each part of data is uniquely corresponding to a dedicated index of the data, and therefore each part of data is corresponding to a unique cryptography parameter.

Figure 8:
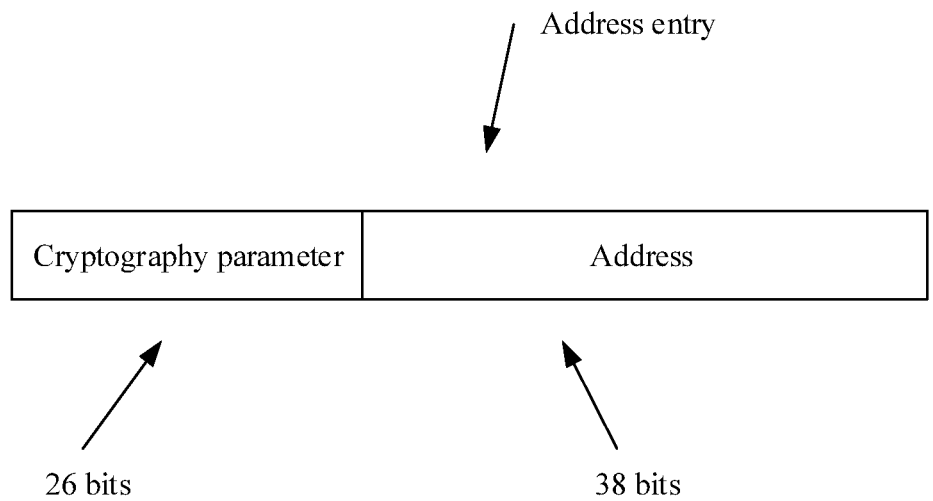
FIG. 8 is a schematic diagram of a key configuration table or a configuration manner of an entry of a key configuration table according to an embodiment of the present disclosure.

In the embodiment in FIG. 5 or FIG. 6, cryptography information stored in the runtime memory 30, for example, the key index table 3021 or the key configuration table 3025, may be a part of the configuration information 302. Other configuration information, for example the I/O command described above, is used to indicate information, for example, an address of data of a source memory that is read, an address of a destination memory that is written, and a length of operated data, required for data transfer. The I/O command may also be a command table itself, and is stored in the runtime memory 30. The command table meets a memory protocol corresponding to a memory type, and may be an SGL or a PRP table. The key index table 3021 or the key configuration table 3025 may be a separate table different from the command table and stored in a different location in the runtime memory 30 from the command table. Alternatively, in a possible implementation, the key index table 3021 or the key configuration table 3025 may be combined with the command table to form one table. For a command table in an existing NVMe storage protocol, for example, the SGL or the PRP table, an unused bit may exist in a field, for example, a source address field or a destination address field, that is of an entry in the command table and that is used to indicate an address. In this case, the unused bit may be used to indicate a key or a key index. It is assumed that in the command table, an address that is in the runtime memory 30 and that needs to be read or written is used as a table lookup input for searching for the key. An unused part in an entry storing the address is used to indicate a corresponding key or key index, or may be further selectivity used to indicate the cryptography vector. As shown in FIG. 8, an entry in the SGL or the PRP table includes, for example, 64 bits, and an original function of the entry is used to indicate a storage address. However, in an actual product implementation, only 38 low-order bits in the address entry are occupied by address information due to limited actual storage space or another reason, and remaining 26 high-order bits are not occupied by the address information. In this case, the 26 bits may be used to store cryptography parameters such as the key and the cryptography vector in the key configuration table 3025, or may be used to store the key index and the cryptography vector in the key index table 3021. Alternatively, the cryptography vector in the foregoing solution may be omitted, and this is not limited in this embodiment. In this way, the software 103 only needs to modify an I/O command table that can be supported by an existing memory protocol, for example, change the SGL or the PRP, to form the command table required in this embodiment. The command table has functions of both the conventional I/O command table and the key index table 3021 or the key configuration table 3025 that is used to indicate the cryptography parameter. Therefore, there is no need to separately generate or configure the independent key index table 3021 or the independent key configuration table 3025. Based on the foregoing solution, the processor 102 or the software 103 may directly add the cryptography parameter to the conventional I/O command table to obtain a command table in which the key index table 3021 or the key configuration table 3025 is integrated. This saves storage resources and simplifies a processing process on the basis of good compatibility with the existing memory protocol.

It should be noted that a protocol type that is of a memory and that is supported in the foregoing embodiment is merely an example, and the foregoing solution is also applicable to data transfer between memories of other types. In addition, the foregoing solution before this embodiment uses the data transfer between different memories, for example, data transfer between the data memory 20 and the runtime memory 30, as an example for description. Actually, an apparatus and the method may also be deformed to be used in another data transfer solution, for example, data transfer between a system on chip 10 and the data memory 20. When the system on chip 10 needs to perform data transfer between the data memory 20 and any device inside the system on chip 10, deformation of the foregoing solution may be used. Because the data memory 20 is equipped with a built-in memory controller 202, when data needs to be written from the any device in the system on chip 10 to the data memory 20, or data needs to be read from the data memory 20 and sent to the any device, the processor 102 may be configured to generate the configuration information 302, and store the configuration information 302 in the runtime memory 30. The configuration information 302 includes an I/O command used for data transfer and cryptography information. In this case, slightly different from the foregoing embodiment, addresses that are indicated by the I/O command and that are related to the data transfer are an address of the any device (the address at this time is not a storage address, but an identifier of the device), and a read or write address of a storage medium in the data memory 20. A cryptography device 105 may still be configured to perform a cryptography operation based on the cryptography information in the configuration information 302, and couple to the data memory 20 through a PCIe interface 106, to transfer the data between the data memory 20 and the any device. The any device may include the processor 102, a communications processing system, a voice subsystem, a power control system, a codec, a display subsystem, an ISP, or the like. Therefore, the any device replaces the runtime memory 30, and is used as a source address device or a destination address device for the data transfer, to write the data from the source address device into the data memory 20, or read the data from the data memory 20 and write the data to the destination address device.

Without loss of generality, such a change of the source address device or the destination address device does not change essence of the technical solution. Even if the device is not a device inside the system on chip 10, implementation of the solution is not affected. For example, if data needs to be transferred between a memory that is equipped with a built-in memory controller, and a subscriber identity module (SIM) card or a pluggable security digital (e.g., Secure Digital (SD)) card, a related technical solution is also applicable. The processor 102, and the cryptography device 105 and the PCIe interface 106 in a connector 104 may play their respective functions to implement data transfer between the card and the memory. If the data transfer needs to be performed between any device in an electronic device 01 and any type of memory that is equipped with the built-in memory controller, where the any type of memory includes but is not limited to the data memory 20 configured to store data, the foregoing related technical solution before this embodiment is still applicable as long as a data transfer address of the I/O command in the configuration information 302 is changed, and the cryptography information is modified. For example, an address in a key index table 3021 or an address in a key configuration table 3025 is changed, and a direction of a data stream is changed to enable a start point of the data stream to point to a new source address device, or an end point of the data stream to point to a new destination address device.

Figure 9:
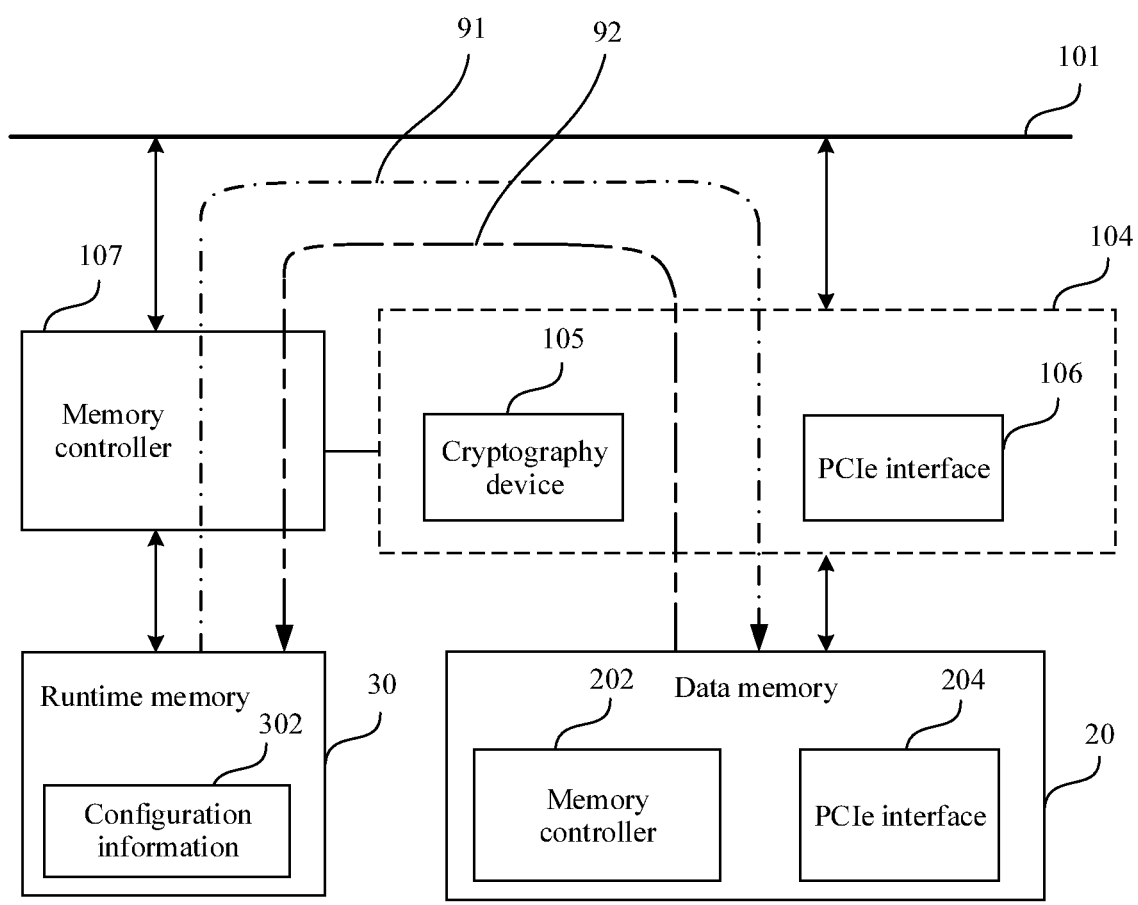
FIG. 9 is a schematic diagram of a data transfer method according to an embodiment of the present disclosure.

FIG. 5 and FIG. 6 respectively describe schematic diagrams of two different data transfer processes between the runtime memory 30 and the data memory 20. A data transfer channel between the runtime memory 30 and the data memory 20 includes a memory controller 107, a bus 101, the cryptography device 105, and the PCIe interface 106. Another component, for example, a dedicated DMA device configured to control the data transfer, may also be selectively involved. This is not limited in this embodiment. Actually, the data transfer may be bidirectional, that is, the runtime memory 30 and the data memory 20 may synchronously transfer data to each other. As shown in FIG. 9, an identifier 91 indicates that the data is transferred from the runtime memory 30 to the data memory 20, and a process indicated by an identifier 92 is in the opposite direction. Data transfer in the two directions may be performed asynchronously at different time points, but may also be performed synchronously. Therefore, in a possible implementation, a cryptography device may synchronously perform encryption and decryption. For any memory, a memory controller of the memory may read data and write data at the same time. The runtime memory 30 is used as an example. Plaintext data written into the runtime memory 30 includes first data, and plaintext data synchronously read from the runtime memory 30 includes second data. Both the first data and the second data are plaintext data, but belong to two different transfer processes. Correspondingly, after being encrypted into ciphertext data, the second data becomes third data and is stored in the data memory 20. Fourth data is read from the data memory 20 and decrypted to obtain the first data that is to be written into the runtime memory 30. Both the third data and the fourth data are ciphertext data, but belong to two different transfer processes. The first data and the second data may be a same type of data, for example, both the first data and the second data are program code data or user data. Alternatively, the first data and the second data may be different types of data. For example, one of the first data and the second data is the program code data, and the other is the user data.

The system on chip 10 in the foregoing embodiment is a complete chip or an integrated semiconductor device. In an alternative implementation, the system on chip 10 may alternatively be replaced with a chip set including a plurality of different chips. To be specific, components in the system on chip 10, such as the processor 102 and the connector 104, may be separately located on different chips. In another alternative implementation, some components in the system on chip 10 in the foregoing embodiment may also be located outside the chip, and implemented by a discrete device. Therefore, the components in the system on chip 10 may be implemented by combining an integrated device or a discrete device, without changing the essence of the technical solution.

Based on the foregoing technical solution, when the memory that is equipped with the built-in memory controller transfers data to another device in the electronic device through the system on chip or to the component in the system on chip, the processor may configure the cryptography information, to enable the dedicated cryptography device independent of the processor can perform cryptography processing. In this way, a secure operation on a system-on-chip side is implemented. This prevents the plaintext data from being transmitted between a device and a memory through a general PCIe interface, and improves security. In addition, the memory that is equipped with the built-in memory controller has higher extensibility and lower complexity. The foregoing embodiment may also be well compatible with an existing memory protocol. Each time a memory type is updated or a new memory needs to be used, the system on chip 10 can support a new memory type without being greatly modified.

It may be understood that, in the foregoing embodiment, the software 103 run by the processor 102 may be implemented in a form of a computer program product. The computer program product may include one or more computer instructions. The computer instructions may be stored in a computer-readable storage medium, for example, the data memory 20 or the runtime memory 30, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may include a magnetic medium (for example, a floppy disk, a hard disk, or a magnetic tape), an optical medium (for example, a digital versatile disk (DVD)), a semiconductor medium (for example, a solid-state disk (SSD)), or the like. Alternatively, the usable medium may include various memories mentioned in the foregoing embodiments.

Obviously, a person skilled in the art can make various modifications and variations to embodiments of this application without departing from the scope of this application. This application is intended to cover these modifications and variations provided that they fall within the scope of protection defined by the following claims and their equivalent technologies. For example, the solutions of the foregoing different embodiments may be combined with each other.

For example, for some details of the method procedure solution corresponding to FIG. 5 or FIG. 6, refer to descriptions in other specific description parts before or after the method procedure solution.

The invention claimed is:

1. A secure data transfer apparatus comprising:
a processor configured to:
run a driver software to generate cryptography information, wherein the cryptography information comprises a key index table comprising a plurality of storage addresses and a first key index corresponding to each of the storage addresses; and
store the key index table in a second memory located outside the secure data transfer apparatus;
a cryptography device configured to:
obtain a current cryptography parameter based on the cryptography information; and
perform a cryptography operation using the current cryptography parameter,
wherein the cryptography operation comprises at least one of the following:
encrypting plaintext data to obtain ciphertext data; or
decrypting the ciphertext data to obtain the plaintext data; and
a first interface configured to perform a ciphertext data exchange with a first memory controller in a first memory located outside the secure data transfer apparatus, wherein the ciphertext data exchange comprises at least one of the following:
sending the ciphertext data from the cryptography device to the first memory controller when the first memory needs to be written; or
sending the ciphertext data from the first memory controller to the cryptography device when the first memory needs to be read,
wherein the cryptography device comprises:
a storage configured to store a key lookup table comprising a plurality of second key indexes and a key corresponding to each of the second key indexes; and
a control circuit configured to:
obtain a current storage address corresponding to either writing of the first memory or reading of the first memory;
search the key index table in the second memory to obtain a current key index corresponding to the current storage address; and
search the key lookup table to obtain a current key corresponding to the current key index.

2. The secure data transfer apparatus of claim 1, wherein the current cryptography parameter comprises at least one of a current key or a current cryptography vector.

3. The secure data transfer apparatus of claim 1, wherein the cryptography device is further configured to perform a plaintext data exchange with the second memory located outside the secure data transfer apparatus, and wherein the plaintext data exchange comprises:
obtaining the plaintext data from the second memory when the first memory is to be written to; and
providing the plaintext data for the second memory when the first memory is to be read from.

4. The secure data transfer apparatus of claim 3, further comprising a second memory controller coupled to the cryptography device and the second memory and configured to:
read the plaintext data from the second memory when the first memory is to be written to; and
send the plaintext data to the cryptography device.

5. The secure data transfer apparatus of claim 3, further comprising a second memory controller coupled to the cryptography device and the second memory and configured to:
receive the plaintext data from the cryptography device when the first memory is to be read from; and
write the plaintext data into the second memory.

6. The secure data transfer apparatus of claim 1, wherein the control circuit is further configured to obtain, based on the cryptography information, the current cryptography parameter corresponding to the current storage address, and wherein the cryptography device further comprises a cryptography circuit configured to further perform the cryptography operation using the current cryptography parameter.

7. The secure data transfer apparatus of claim 6, wherein the cryptography information comprises a key configuration table comprising a plurality of storage addresses and a cryptography parameter corresponding to each of the storage addresses, wherein the processor is further configured to store the key configuration table in a second memory located outside the secure data transfer apparatus, and wherein the control circuit is further configured to search the key configuration table based on the current storage address to obtain the current cryptography parameter.

8. The secure data transfer apparatus of claim 6, wherein the cryptography information comprises a key configuration table comprising a plurality of storage addresses and a cryptography parameter corresponding to each of the storage addresses, wherein the cryptography device further comprises a storage configured to store the key configuration table, wherein the processor is further configured to configure the key configuration table, and wherein the control circuit is configured to search the key configuration table based on the current storage address to obtain the current cryptography parameter.

9. The secure data transfer apparatus of claim 1, wherein the processor is further configured to generate an input/output (I/O) command indicating the current storage address.

10. The secure data transfer apparatus of claim 9, wherein the processor is further configured to provide the I/O command for the first memory controller, and wherein the first interface is further configured to:
obtain the current storage address from the first memory controller; and
forward the current storage address to the control circuit, and
wherein the control circuit is further configured to receive the current storage address from the first interface.

11. The secure data transfer apparatus of claim 1, wherein the key index table further comprises a cryptography vector corresponding to each of the storage addresses, and wherein the control circuit is further configured to search the key index table to obtain a current cryptography vector corresponding to the current storage address.

12. The secure data transfer apparatus of claim 1, wherein the secure data transfer apparatus is a system on chip (SoC).

13. The secure data transfer apparatus of claim 1, wherein the first interface comprises a Peripheral Component Interconnect Express (PCIe) interface, and wherein the first interface is coupled to the cryptography device.

14. A secure data transfer system comprising:
a first memory comprising a first memory controller; and
a secure data transfer apparatus comprising:
a processor configured to:
run a driver software to generate cryptography information, wherein the cryptography information comprises a key index table comprising a plurality of storage addresses and a first key index corresponding to each of the storage addresses; and
store the key index table in a second memory located outside the secure data transfer apparatus;
a cryptography device configured to:
obtain a current cryptography parameter based on the cryptography information; and
perform a cryptography operation using the current cryptography parameter,
wherein the cryptography operation comprises at least one of the following:
encrypting plaintext data to obtain ciphertext data; or
decrypting the ciphertext data to obtain the plaintext data; and
a first interface configured to perform a ciphertext data exchange with the first memory controller, wherein the ciphertext data exchange comprises at least one of the following:
sending the ciphertext data from the cryptography device to the first memory controller when the first memory needs to be written; or
sending the ciphertext data from the first memory controller to the cryptography device, and
wherein the cryptography device comprises:
a storage configured to store a key lookup table comprising a plurality of second key indexes and a key corresponding to each of the second key indexes; and
a control circuit configured to:
obtain a current storage address corresponding to either writing of the first memory or reading of the first memory;
search the key index table in the second memory to obtain a current key index corresponding to the current storage address; and
search the key lookup table to obtain a current key corresponding to the current key index,
wherein the first memory further comprises:
a second interface coupled to the first interface and configured to:
receive the ciphertext data from the first interface when a write operation is performed on the first memory, or
send the ciphertext data to the first interface when a read operation is performed on the first memory;
a storage medium configured to store the ciphertext data, and
wherein the first memory controller is further configured to perform at least one of the following:
receiving the ciphertext data from the second interface and writing the ciphertext data into the storage medium; or
reading the ciphertext data from the storage medium and sending the ciphertext data to the second interface.

15. The secure data transfer system of claim 14, further comprising a second memory configured to store the plaintext data.

16. The secure data transfer system of claim 14, wherein the first interface comprises a Peripheral Component Interconnect Express (PCIe) interface.

17. A secure data transfer method comprising:
running a driver software to generate cryptography information, wherein the cryptography information comprises a key index table comprising a plurality of storage addresses and a first key index corresponding to each of the storage addresses;
storing the key index table in a second memory located outside the secure data transfer apparatus;
obtaining, by a cryptography device, a current cryptography parameter based on the cryptography information;
performing, by the cryptography device using the current cryptography parameter, a cryptography operation comprising at least one of the following:
encrypting plaintext data to obtain ciphertext data; or
decrypting the ciphertext data to obtain the plaintext data;
performing, by a first interface, a ciphertext data exchange with a first memory controller in an external first memory, wherein the ciphertext data exchange comprises at least one of the following:
sending the ciphertext data from the cryptography device to the first memory controller when a write operation is performed on the external first memory; or
sending the ciphertext data from the first memory controller to the cryptography device when a read operation is performed on the external first memory;
storing, by a storage of the cryptography device, a key lookup table comprising a plurality of second key indexes and a key corresponding to each of the second key indexes;
obtaining, by a control circuit of the cryptography device, a current storage address corresponding to either writing of the first memory or reading of the first memory;
searching, by the control circuit, the key index table in the second memory to obtain a current key index corresponding to the current storage address; and
searching, by the control circuit, the key lookup table to obtain a current key corresponding to the current key index.

18. The secure data transfer method of claim 17, wherein the current cryptography parameter comprises at least one of a current key or a current cryptography vector.

19. The secure data transfer method of claim 17, further comprising performing a plaintext data exchange with an external second memory, wherein the plaintext data exchange comprises:
obtaining the plaintext data from the external second memory when the external first memory is to be written to; and
providing the plaintext data to the external second memory when the external first memory is to be read from.

20. The secure data transfer method of claim 17, wherein the first interface comprises a Peripheral Component Interconnect Express (PCIe) interface.

* * * * *